(12) United States Patent
Giuliani

(10) Patent No.: US 7,040,891 B1
(45) Date of Patent: May 9, 2006

(54) SYSTEM FOR REDUCING FUEL CONSUMPTION AND POLLUTANT EMISSIONS FROM ASPHALT CEMENT PRODUCTION

(76) Inventor: Anthony J. Giuliani, 2055 Havenswood Pl., Blacklick, OH (US) 43004

( * ) Notice: Subject to any disclaimer, the term of this patent is extended or adjusted under 35 U.S.C. 154(b) by 0 days.

(21) Appl. No.: 11/147,835

(22) Filed: Jun. 8, 2005

(51) Int. Cl.
 *F23G 7/06* (2006.01)
(52) U.S. Cl. .......................... 432/72; 110/345
(58) Field of Classification Search .................. 432/72, 432/16, 58, 106, 152; 110/345, 342, 246
See application file for complete search history.

(56) References Cited

U.S. PATENT DOCUMENTS

| | | | | |
|---|---|---|---|---|
| 4,750,437 | A * | 6/1988 | Rouse | 110/346 |
| 5,176,445 | A * | 1/1993 | Mize | 366/7 |
| 6,524,371 | B1 * | 2/2003 | El-Shoubary et al. | 95/134 |
| 6,688,883 | B1 * | 2/2004 | Tseng et al. | 432/105 |
| 6,770,174 | B1 * | 8/2004 | Richards et al. | 204/157.3 |

* cited by examiner

*Primary Examiner*—Gregory Wilson
(74) *Attorney, Agent, or Firm*—Standley Law Group LLP

(57) ABSTRACT

A system for reducing fuel consumption and pollutant emissions from asphalt cement production facilities which utilizes a recycle stream to reduce organic compound and carbon monoxide concentrations and a sorbent to reduce pollutant concentration prior to discharging the exhaust from the kiln system.

10 Claims, 1 Drawing Sheet

SYSTEM FOR REDUCING FUEL CONSUMPTION AND POLLUTANT EMISSIONS FROM ASPHALT CEMENT PRODUCTION

TECHNICAL FIELD OF THE INVENTION

The present invention is in the field of asphalt production facilities. Specifically, the present invention relates to a system for reducing the fuel consumption and pollutant emissions from asphalt production.

BACKGROUND OF THE INVENTION

As used herein the phrase "organic compounds" includes what are commonly called volatile organic compounds. As used herein the phrase "chemical species" refers generally to pollutant chemicals including but not limited to: organic compounds, carbon monoxide, sulfur dioxide, sulfur trioxide, hydrogen chloride, and mercury.

As used herein "asphalt cement" refers to the material used in the construction of roads and parking lots formed by the admixing and subsequent processing of a highly viscous liquid derived from crude petroleum (typically by fractional distillation) and aggregates.

Because of the constituent ingredients used to manufacture asphalt cement, the process emits undesirable pollutants into the atmosphere. These pollutants include: organic compounds (typically the result of partially or incomplete combustion by-products), carbon monoxide, sulfur dioxide, sulfur trioxide, hydrogen chloride, and mercury. Many of these pollutants are believed to contribute to global warming, the destruction of the ozone layer, the production of acid rain, and are hazardous to human health.

Thus, it is a goal of the present invention to produce a system that reduces the emission of the aforementioned pollutants.

In view of the present disclosure or through practice of the present invention, other advantages may become apparent.

SUMMARY OF THE INVENTION

In general terms, the present invention includes a system for reducing fuel consumption and pollutant emissions from asphalt cement production comprising: (a) a kiln in which asphalt cement is produced, the kiln having an inlet burner area, the kiln discharging an untreated gaseous waste stream comprising at least one chemical species having an initial concentration; (b) an exhaust conduit in fluid communication with the kiln, the exhaust conduit adapted to transport the untreated gaseous waste stream from the kiln; (c) at least one sorbent supply, each sorbent supply in fluid communication with the exhaust conduit so as to be capable of introducing at least one sorbent into the untreated gaseous waste stream, wherein a given sorbent is capable of reacting with at least a portion of the untreated gaseous waste stream so as to produce an at least partially treated waste stream and at least one used sorbent, wherein the at least partially treated waste stream has at least one concentration of at least one chemical species lower than the untreated gaseous waste stream; (d) a baghouse in fluid communication with the kiln exhaust conduit so as to receive the untreated gaseous waste stream from the kiln, so as to precipitate at least a portion of at least one used sorbent, and discharge an at least partially treated waste stream; and (e) a baghouse exhaust conduit in fluid communication with the baghouse so as to receive the at least partially treated gaseous waste stream from the baghouse, wherein at least a portion of the at least partially treated gaseous waste stream traversing the baghouse exhaust conduit is directed to the inlet burner area of the kiln so as to reduce fuel consumption of the kiln.

In one embodiment of the present invention, the chemical species is selected from the group consisting of: organic compounds, carbon monoxide, sulfur dioxide, sulfur trioxide, hydrogen chloride, and mercury.

In another embodiment of the present invention, the portion of the at least partially treated gaseous waste stream directed to the inlet burner comprises between about 20% to about 70% of the at least partially treated gaseous waste stream traversing the baghouse exhaust conduit.

In another embodiment of the present invention, at least one sorbent is introduced into the untreated gaseous waste stream at a temperature between about 250° F. and about 600° F.

In yet another embodiment of the present invention, the sorbent is selected from the group consisting of: sodium bicarbonate, calcium carbonate, calcium hydroxide, and activated carbon.

The present invention additionally provides for a system for reducing fuel consumption from asphalt cement production comprising: (a) a kiln in which the asphalt cement is produced, the kiln having an inlet burner area, the kiln discharging an untreated gaseous waste stream; and (b) a recycle conduit in fluid communication with the kiln so as to receive the untreated gaseous waste stream, wherein at least a portion of the untreated gaseous waste stream is directed to the inlet burner area of the kiln.

In one embodiment of the present invention, the system additionally comprises: (c) a baghouse positioned between the kiln and the recycle conduit such that the untreated gaseous waste stream discharged from the kiln traverses the baghouse prior to entering the recycle conduit.

In one embodiment of the present invention, the portion of the at least partially treated gaseous waste stream directed to the inlet burner comprises between about 20% to about 70% of the at least partially treated gaseous waste stream discharged from the baghouse.

The present invention further provides for a system for reducing pollutant emissions from asphalt cement production comprising: (a) a kiln in which the asphalt cement is produced, the kiln having an inlet burner area, the kiln discharging an untreated gaseous waste stream comprising at least one chemical species having an initial concentration; (b) a kiln exhaust conduit in fluid communication with the kiln adapted to transport the gaseous waste stream from the kiln; (c) at least one sorbent supply, each sorbent supply in fluid communication with the exhaust conduit so as to be capable of introducing at least one sorbent into the untreated gaseous waste stream, wherein a given sorbent is capable of reacting with at least a portion of the untreated gaseous waste stream so as to produce an at least partially treated waste stream and at least one used sorbent, wherein the at least partially treated waste stream has at least one concentration of at least one chemical species lower than the untreated gaseous waste stream; and (d) a baghouse in fluid communication with the kiln exhaust conduit so as to receive the untreated gaseous waste stream from the kiln, precipitate the at least one used sorbent, and discharge an at least partially treated waste stream.

In one embodiment of the present invention, the pollutant emissions comprise at least one pollutant selected from the group consisting of: sulfur dioxide, sulfur trioxide, hydrogen chloride, and mercury.

In yet another embodiment of the present invention, at least one sorbent is introduced into the untreated gaseous waste stream at a temperature between about 250° F. and about 600° F.

DETAILED DESCRIPTION OF THE PREFERRED EMBODIMENT(S)

Figure 1:
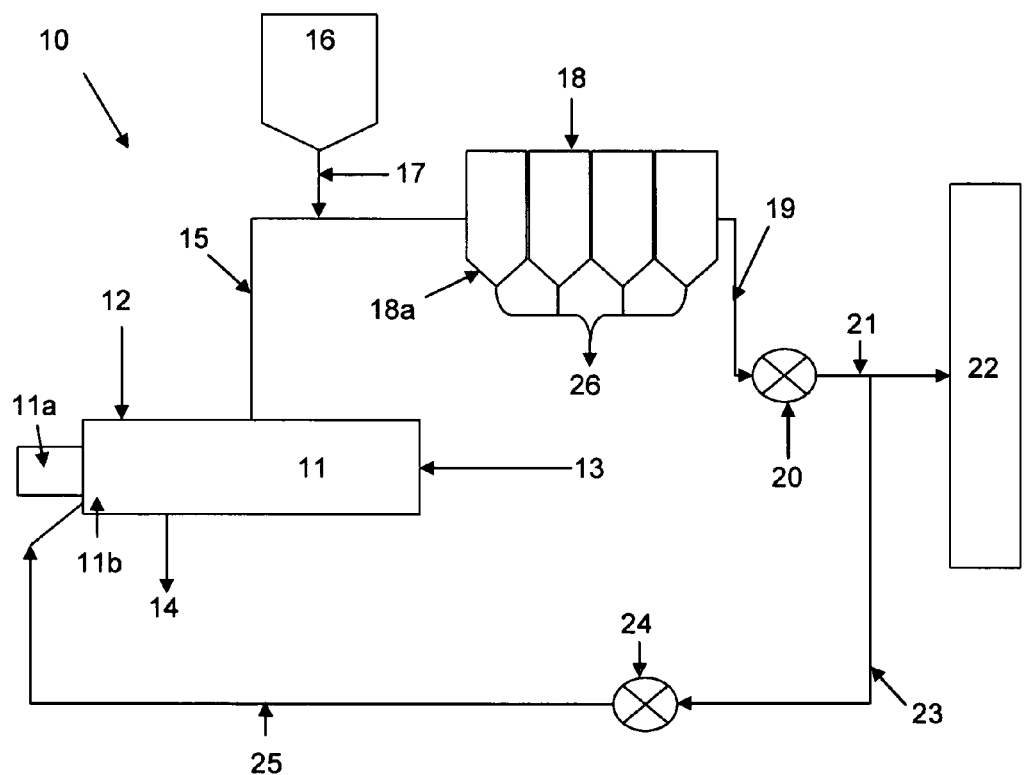
FIG. 1 provides a schematic diagram of one embodiment of the present invention.

In accordance with the foregoing summary of the invention, the following presents a detailed description of the preferred embodiment of the invention which is presently considered to be its best mode.

FIG. 1 presents one embodiment of the inventive system 10 for reducing fuel consumption and pollutant emissions from asphalt cement production. As shown in FIG. 1, a kiln 11, having a burner 11a and an inlet burner area 11b is provided with a supply of slag 12 and aggregate 13 so as to produce asphalt cement 14. The kiln produces an untreated gaseous waste stream which is discharged through exhaust conduit 15. Exhaust conduit 15 is in fluid communication with a source of sorbent 16 via conduit 17 to permit injection of sorbent into the untreated gaseous waste stream traversing the exhaust conduit. The exhaust conduit terminates into the primary chamber 18a of baghouse 18. After the sorbent has had an opportunity to adsorb at least a portion of one pollutant present in the untreated gaseous waste stream, the spent sorbent is collected in baghouse 18 and a stream of at least partially treated waste substantially free of spent sorbent is discharged via baghouse conduit 19. The spent sorbent collected in baghouse 18 is discharged as waste stream 26. Baghouse conduit 19 transports the at least partially treated waste stream to exhaust fan 20. Exhaust fan 20 propels the at least partially treated waste stream to stack 22 for release into the atmosphere. A first conduit 23 diverts a portion of the at least partially treated waste stream from the stack using fan 24 to propel the waste stream through conduit 25 to the inlet burner area 11b where any residual organic compounds and/or carbon monoxide are burned thereby helping to reduce the concentrations of these compounds in the stack.

In view of the present disclosure or through practice of the present invention, it will be within the ability of one of ordinary skill to make modifications to the present invention, such as through the use of equivalent arrangements and compositions, in order to practice the invention without departing from the spirit of the invention as reflected in the appended claims.

What is claimed is:

1. A system for reducing fuel consumption and pollutant emissions from asphalt cement production, said system comprising;
   (a) a kiln in which said asphalt cement is produced, said kiln having an inlet burner area, said kiln discharging an untreated gaseous waste stream, said untreated gaseous waste stream comprising at least one chemical species having an initial concentration;
   (b) an exhaust conduit in fluid communication with said kiln, said exhaust conduit adapted to transport said untreated gaseous waste stream from said kiln;
   (c) at least one sorbent supply, each said sorbent supply in fluid communication with said exhaust conduit so as to be capable of introducing at least one sorbent into said untreated gaseous waste stream, wherein a said sorbent is capable of reacting with at least a portion of said untreated gaseous waste stream so as to produce an at least partially treated waste stream and at least one used sorbent, wherein said at least partially treated waste stream has at least one concentration of at least one said chemical species lower than said untreated gaseous waste stream;
   (d) a baghouse in fluid communication with said kiln exhaust conduit so as to receive said untreated gaseous waste stream from said kiln, precipitate at least a portion of said at least one used sorbent, and discharge an at least partially treated waste stream; and
   (e) a baghouse exhaust conduit in fluid communication with said baghouse so as to receive said at least partially treated gaseous waste stream from said baghouse, wherein at least a portion of said at least partially treated gaseous waste stream traversing said baghouse exhaust conduit is directed to said inlet burner area of said kiln so as to reduce said fuel consumption.

2. The system according to claim 1 wherein said chemical species is selected from the group consisting of: organic compounds, carbon monoxide, sulfur dioxide, sulfur trioxide, hydrogen chloride, and mercury.

3. The system according to claim 1 wherein said portion of said at least partially treated gaseous waste stream directed to said inlet burner comprises between about 20% to about 70% of said at least partially treated gaseous waste stream traversing said baghouse exhaust conduit.

4. The system according to claim 1 wherein at least one said sorbent is introduced into said untreated gaseous waste stream at a temperature between about 250° F. and about 600° F.

5. The system according to claim 1 wherein said sorbent is selected from the group consisting of: sodium bicarbonate, calcium carbonate, calcium hydroxide, and activated carbon.

6. A system for reducing fuel consumption from asphalt cement production, said system comprising:
   (a) a kiln in which said asphalt cement is produced, said kiln having an inlet burner area, said kiln discharging an untreated gaseous waste stream;
   (b) a recycle conduit in fluid communication with said kiln so as to receive said untreated gaseous waste stream, wherein at least a portion of said untreated gaseous waste stream is directed to said inlet burner area of said kiln; and
   (c) a baghouse positioned between said kiln and said recycle conduit such that said untreated gaseous waste stream discharged from said kiln traverses said baghouse prior to entering said recycle conduit.

7. The system according to claim 6 wherein said at least a portion of said untreated gaseous waste stream directed to said inlet burner comprises between about 20% to about 70% of said untreated gaseous waste stream discharged from said baghouse.

8. A system for reducing pollutant emissions from asphalt cement production, said system comprising;
   (a) a kiln in which said asphalt cement is produced, said kiln having an inlet burner area, said kiln discharging an untreated gaseous waste stream, said untreated gaseous waste stream comprising at least one chemical species having an initial concentration;
   (b) a kiln exhaust conduit in fluid communication with said kiln, said kiln exhaust conduit adapted to transport said gaseous waste stream from said kiln;

(c) at least one sorbent supply, each said sorbent supply in fluid communication with said exhaust conduit so as to be capable of introducing at least one sorbent into said untreated gaseous waste stream, wherein a said sorbent is capable of reacting with at least a portion of said untreated gaseous waste stream so as to produce an at least partially treated waste stream and at least one used sorbent, wherein said at least partially treated waste stream has at least one concentration of at least one said chemical species lower than said untreated gaseous waste stream; and (d) a baghouse in fluid communication with said kiln exhaust conduit so as to receive said untreated gaseous waste stream from said kiln, precipitate said at least one used sorbent, and discharge an at least partially treated waste stream.

9. The system according to claim 8 wherein said pollutant emissions comprise at least one pollutant selected from the group consisting of: sulfur dioxide, sulfur trioxide, hydrogen chloride, and mercury.

10. The system according to claim 8 wherein at least one said sorbent is introduced into said untreated gaseous waste stream at a temperature between about 250° F. and about 600° F.

* * * * *